(12) United States Patent
Kukkula et al.

(10) Patent No.: US 11,457,423 B2
(45) Date of Patent: Sep. 27, 2022

(54) RADIO COMMUNICATIONS

(71) Applicant: Nordic Semiconductor ASA, Trondheim (NO)

(72) Inventors: Ilari Kukkula, Trondheim (NO); Tapani Jaakola, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 121 days.

(21) Appl. No.: 16/771,652

(22) PCT Filed: Dec. 11, 2018

(86) PCT No.: PCT/GB2018/053596
§ 371 (c)(1),
(2) Date: Jun. 10, 2020

(87) PCT Pub. No.: WO2019/116026
PCT Pub. Date: Jun. 20, 2019

(65) Prior Publication Data
US 2021/0185627 A1    Jun. 17, 2021

(30) Foreign Application Priority Data
Dec. 11, 2017 (GB) .................................... 1720612

(51) Int. Cl.
*H04W 56/00* (2009.01)
*H04L 12/841* (2013.01)
(Continued)

(52) U.S. Cl.
CPC ......... *H04W 56/003* (2013.01); *H04L 47/283* (2013.01); *H04L 47/74* (2013.01); *H04W 56/004* (2013.01)

(58) Field of Classification Search
CPC .............. H04W 56/003; H04W 56/004; H04L 47/283; H04L 47/74
(Continued)

(56) References Cited

U.S. PATENT DOCUMENTS

| 6,360,271 | B1 | 3/2002 | Schuster et al. |
| 9,229,847 | B1 * | 1/2016 | McKown ............ G06F 3/0683 |

(Continued)

FOREIGN PATENT DOCUMENTS

| EP | 1 517 466 A2 | 3/2005 |
| GB | 2 360 918 A | 10/2001 |

OTHER PUBLICATIONS

International Search Report and Written Opinion for PCT/GB2018/053596, dated Jul. 29, 2019, 12 pages.
(Continued)

*Primary Examiner* — Faisal Choudhury
(74) *Attorney, Agent, or Firm* — Klarquist Sparkman, LLP

(57) ABSTRACT

A radio receiver device is arranged to store samples of incoming data symbols in an indexed memory portion having a length of A+B+C. A first data buffer 20-1 has an initial address at index 0 and a final address at index A−1. A timing adjustment buffer 22 has an initial address at index A and a final address at index A+B−1. A second data buffer 20-2 has an initial address at an index A+B and a final address at an index A+B+C−1. A buffer switch pointer 24 has a trigger address between the index 0 and the index A+B−1, at which it triggers a switch 26 from the first to the second buffer. If the current address matches the trigger address, the current address is set to the index A+B. Otherwise, the current address is incremented. If there is a timing offset between local and network clocks, the trigger address is moved to reduce the offset.

13 Claims, 3 Drawing Sheets

(51) Int. Cl.
*H04L 47/283* (2022.01)
*H04L 47/74* (2022.01)

(58) Field of Classification Search
USPC .......................................... 370/329
See application file for complete search history.

(56) References Cited

U.S. PATENT DOCUMENTS

| | | |
|---|---|---|
| 2005/0110228 A1 | 5/2005 | Fujimori |
| 2015/0110228 A1* | 4/2015 | Elenes ................ H04L 27/2657 375/343 |
| 2017/0031629 A1* | 2/2017 | Nakamoto .......... G06F 12/0246 |
| 2018/0373625 A1* | 12/2018 | Liu ........................ G06F 11/00 |

OTHER PUBLICATIONS

IPO Search Report under Section 17(5) for GB 1720612.9, dated May 31, 2018, 4 pages.
Release 13 from "3GPP," downloaded from www.3gpp.org/release-13, dated Oct. 9, 2015, 2 pages.

* cited by examiner

RADIO COMMUNICATIONS

CROSS REFERENCE TO RELATED APPLICATIONS

This is the U.S. National Stage of International Application No. PCT/GB2018/053596, filed Dec. 11, 2018, which was published in English under PCT Article 21(2), which in turn claims the benefit of Great Britain Application No. 1720612.9, filed Dec. 11, 2017.

TECHNICAL FIELD

The present invention relates to receiving data packets via a radio communications network, in particular a cellular network such as a Long Term Evolution (LTE) network, and specifically to addressing offsets between local timing and network timing.

BACKGROUND

Throughout the course of the past few decades, the extent and technical capabilities of cellular-based radio communication systems have expanded dramatically. A number of different cellular-based networks have been developed over the years, including the Global System for Mobile Communications (GSM), General Packet Radio Services (GPRS), Enhanced Data rates for GSM Evolution (EDGE), and Universal Mobile Telecommunications System (UMTS), where GSM, GPRS, and EDGE are often referred to as second generation (or "2G") networks and UMTS is referred to as a third generation (or "3G") network.

More recently, the Long Term Evolution (LTE) network, a fourth generation (or "4G") network standard specified by the $3^{rd}$ Generation Partnership Project (3GPP), has gained popularity due to its relatively high uplink and downlink speeds and larger network capacity compared to earlier 2G and 3G networks. More accurately, LTE is the access part of the Evolved Packet System (EPS), a purely Internet Protocol (IP) based communication technology in which both real-time services (e.g. voice) and data services are carried by the IP protocol. The air interface of LTE is often referred to as Evolved UMTS Terrestrial Radio Access (or "E-UTRA").

However, while "classic" LTE connections are becoming increasingly prevalent in the telecommunications industry, further developments to the communication standard are being made in order to facilitate the so-called "Internet of Things" (IoT), a common name for the inter-networking of physical devices, sometimes called "smart devices", providing physical objects that may not have been connected to any network in the past with the ability to communicate with other physical and/or virtual objects. Such smart devices include: vehicles; buildings; household appliances, lighting, and heating (e.g. for home automation); and medical devices.

These smart devices are typically real-world objects with embedded electronics, software, sensors, actuators, and network connectivity, thus allowing them to collect, share, and act upon data. These devices may communicate with user devices (e.g. interfacing with a user's smartphone) and/or with other smart devices, thus providing "machine-to-machine" (or "machine type") communication. However, the development of the LTE standards makes it more practical for them to connect directly to the cellular network.

3GPP have specified two versions of LTE for such purposes in Release 13 of the LTE standard. The first of these is called "NarrowBand IoT" (NB-IoT), sometimes referred to as "LTE Cat NB1", and the second is called "enhanced Machine Type Communication" (eMTC), sometimes referred to as "LTE Cat M1". It is envisaged that the number of devices that utilise at least one of these standards for IoT purposes will grow dramatically in the near future.

From a communications perspective, LTE standards (including NB-IoT and eMTC) use orthogonal frequency division multiple access (OFDMA) as the basis for allocating network resources. This allows the available bandwidth between to be shared between user equipment (UE) that accesses the network in a given cell, provided by a base station, referred to in LTE as an "enhanced node B", "eNodeB", or simply "eNB". OFDMA is a multi-user variant of orthogonal frequency division multiplexing (OFDM), a multiplexing scheme in which the total bandwidth is divided into a number of non-overlapping sub-bands, each having its own sub-carrier frequency. In OFDM, unlike other frequency division multiplexing (FDM) schemes, each of these sub-carriers are orthogonal to one another such that cross-talk between sub-bands is ideally eliminated and removing the need for inter-carrier guard bands.

The UE typically uses a buffer to store the incoming data for subsequent processing, e.g. by a digital signal processor (DSP). This buffer may be several symbols wide, for example it may be arranged to store an entire slot, an entire sub-frame, or an entire frame at a time. In some cases, the UE may have multiple buffers, arranged such that the UE switches between them periodically. For example, if the UE has two buffers, each one sub-frame wide, it may fill up one buffer while processing the data in the other and then switch their roles for the next incoming sub-frame.

As outlined above, a UE may be provided with multiple buffers for storing samples of incoming data and the UE may switch between them as they fill up, where these samples are typically complex (IQ) samples, i.e. in-phase (I) and quadrature (Q) samples and many samples are taken for each incoming OFDM symbol. Those skilled in the art will appreciate that the number of IQ samples that correspond to each incoming OFDM symbol will of course depend on the sample rate, which is typically set to a value corresponding to the system bandwidth in use in accordance with the standard. When operating in accordance with the LTE specification for example, the bandwidth may be either 1.4, 3, 5, 10, or 20 MHz, where the corresponding sample rate is 1.92, 3.84, 7.68, 15.36, 23.04, or 30.72 MHz respectively.

When the UE receives data from the eNodeB, it usually relies on local timing to determine when the switch between the buffers should occur. The local timing within the UE typically relies on a local clock signal produced by, for example, an oscillator.

However, practical clock generators such as oscillators are not perfect devices, and the clock signals they produce can "drift" relative to the network timing over time. For example, if the local clock frequency is not exactly identical to the frequency of the incoming data from the eNodeB, the relative timings will eventually drift apart. Timing misalignments may also occur, for example, due to movement of the UE.

If this timing misalignment occurs, the buffers may fill incorrectly such that the point at which the UE switches between the buffers may not correctly line up with the incoming data. For example, if the buffers are one sub-frame wide, a timing misalignment might cause the switch to occur one or more samples early or late, such that the switch occurs in the middle of an OFDM symbol. It is important to be able to determine which samples correspond to which data symbols in order to be able to determine the value of each incoming OFDM symbol accurately.

This can result in the data becoming difficult or impossible to demodulate. Conventional receivers, known in the art per se, may overcome this issue by re-calculating the buffer access pointers every time the timing changes, however the Applicant has appreciated that this creates additional unwanted overhead for the processor. The Applicant has further appreciated that conventional arrangements are not able to guarantee race-free operation with regard to the hardware filling the buffer and the processor reading the buffer because a race condition may arise when the read and write pointers change with the timing adjustments.

It is important for efficient use of a vector processor that the processor handles (i.e. the abstracted references to a particular resource such as a memory location) are accessible with as little overhead as possible. Conventional arrangements typically require that the pointers to buffered data are updated after performing timing adjustments. Such arrangements also typically require intra-vector shifts and/or shuffling operations that increase the overhead associated with accessing memory resources.

SUMMARY OF THE INVENTION

When viewed from a first aspect, the present invention provides a radio receiver device arranged to receive a plurality of data symbols from an incoming bitstream and store a plurality of samples of each of the plurality of data symbols in an indexed memory portion having a length of at least A+B+C memory units, wherein A, B, and C are positive, non-zero integers, said memory portion being logically arranged such that:
  a first data buffer has an initial address at an index 0 and a final address at an index A−1;
  a timing adjustment buffer has an initial address at an index A and a final address at an index A+B−1;
  a second data buffer has an initial address at an index A+B and a final address at an index A+B+C−1; and
  a buffer switch pointer having a trigger address and arranged to trigger a switch from the first data buffer to the second buffer when a current address matches the trigger address, said trigger address being an address between the index 0 and the index A+B−1;
  wherein the radio receiver is arranged such that:
  on initialisation, the current address is set to the index 0;
  each incoming sample is stored at the current address;
  if the current address does not match the trigger address, the current address is incremented, but if the current address does match the trigger address, the current address is set to the index A+B; and
  if the radio receiver device determines that there is a timing offset between a local reference clock and a network clock, the trigger address is moved in order to reduce the timing offset.

This first aspect of the invention extends to a radio communication system comprising a radio transmitter device and a radio receiver device, wherein the radio transmitter device is arranged to transmit a bitstream comprising a plurality of data symbols, and wherein radio receiver device arranged to receive the bitstream from the radio transmitter and store a plurality of samples of the plurality of data symbols in an indexed memory portion having a length of at least A+B+C memory units, wherein A, B, and C are positive, non-zero integers, said memory portion being logically arranged such that:
  a first data buffer has an initial address at an index 0 and a final address at an index A−1;
  a timing adjustment buffer has an initial address at an index A and a final address at an index A+B−1;
  a second data buffer has an initial address at an index A+B and a final address at an index A+B+C−1; and
  a buffer switch pointer having a trigger address and arranged to trigger a switch from the first data buffer to the second buffer when a current address matches the trigger address, said trigger address being an address between the index 0 and the index A+B−1;
  wherein the radio receiver is arranged such that:
  on initialisation, the current address is set to the index 0;
  each incoming sample is stored at the current address;
  if the current address does not match the trigger address, the current address is incremented, but if the current address does match the trigger address, the current address is set to the index A+B; and
  if the radio receiver device determines that there is a timing offset between a local reference clock and a network clock, the trigger address is moved in order to reduce the timing offset.

This first aspect of the invention also extends to a method of operating a radio receiver device comprising an indexed memory portion having a length of at least A+B+C memory units, wherein A, B, and C are positive, non-zero integers, said memory portion being logically arranged such that:
  a first data buffer has an initial address at an index 0 and a final address at index A−1;
  a timing adjustment buffer has an initial address at an index A and a final address at an index A+B−1;
  a second data buffer has an initial address at an index A+B and a final address at an index A+B+C−1; and
  a buffer switch pointer having a trigger address and arranged to trigger a switch from the first data buffer to the second buffer when a current address matches the trigger address, said trigger address being an address between the index 0 and the index A+B−1;
  wherein the method comprises:
  setting the current address to the index 0 on initialisation;
  receiving a plurality of data symbols from an incoming bitstream;
  storing each incoming data symbol at the current address;
  incrementing the current address if the current address does not match the trigger address, but setting the current address to the index A+B if the current address does match the trigger address; and
  determining when there is a timing offset between a local reference clock and a network clock and moving the trigger address in order to reduce the timing offset.

This first aspect of the invention further extends to a non-transitory, computer readable medium comprising instructions that, when executed on a suitable processor, performs a method of operating a radio receiver device arranged to receive a plurality of data symbols from an incoming bitstream and store a plurality of samples of each of the plurality of data symbols in an indexed memory portion having a length of at least A+B+C memory units, wherein A, B, and C are positive, non-zero integers, said memory portion being logically arranged such that:
  a first data buffer has an initial address at an index 0 and a final address at an index A−1;
  a timing adjustment buffer has an initial address at an index A and a final address at an index A+B−1;
  a second data buffer has an initial address at index an A+B and a final address at an index A+B+C−1; and a buffer switch pointer having a trigger address and arranged to trigger a switch from the first data buffer to the second buffer when a current address matches the trigger address, said trigger address being an address between the index 0 and the index A+B−1;

wherein the method comprises:

setting the current address to the index 0 on initialisation;

storing each incoming sample at the current address;

incrementing the current address if the current address does not match the trigger address, but setting the current address to the index A+B if the current address does match the trigger address; and determining when there is a timing offset between a local reference clock and a network clock and moving the trigger address in order to reduce the timing offset.

Thus it will be appreciated by those skilled in the art that embodiments of the present invention provide an improved radio receiver device that can dynamically adjust its local timing relative to the network timing so as to realign the buffer switching point in order to ensure that samples of the data symbols are stored correctly (i.e. it can adjust the timing 'on-the-fly', during operation). Embodiments of the present invention address the timing misalignment issues outlined above by being able to adjust the timing for when the receiver switches between the buffers by moving the address at which the buffer switch pointer triggers switching between the buffers so as to advance or delay the switch.

It will be appreciated that the indices referred to hereinabove are to be understood as being relative rather than absolute. For example, "an index 0" should be understood to be the initial index of where the first data buffer begins, and does not imply that it is necessary for this index to be located at the first memory location that physically or logically exists. The various buffers may be begin at any suitable physical or logical location in memory.

Those skilled in the art will appreciate that the timing adjustment buffer can provide an overflow where extra samples can be stored and in which the trigger address can be moved to a later address in order to delay the timing of the switch between the buffers, allowing the receiver to realign the timing so that the samples are arranged in the buffers as intended—i.e. using the previous example, each incoming sub-frame is placed completely in a buffer before switching buffer ready for the next sub-frame.

Similarly, if the timing offset were instead such that the buffer switch point occurred too early causing a data underflow, i.e. where samples were received and stored in the wrong buffer because the receiver was set to switch buffers too late, the trigger address could be moved within the first or second data buffer as appropriate to realign the switch timing.

The Applicant has appreciated that this approach provides efficient use of a vector processor whereby the appropriate memory locations are accessible with a much reduced overhead compared to conventional approaches known in the art per se. A radio receiver device in accordance with embodiments of the present invention does not require the updating of any pointers to the buffered data after performing timing adjustments, as instead the relative sizes of the first and second data buffers are increased or decreased, making use of the timing adjustment buffer if necessary. The present invention also removes the need to perform intra-vector shifts and shuffling operations, further reducing the overhead associated with accessing memory resources.

Once the realignment has taken place, providing the local and network timings are now correctly aligned, the trigger address of the buffer switch pointer can return to its default position and thus, at least in some embodiments, the radio receiver is further arranged such that if the radio receiver device determines that any remaining timing offset between the local reference clock and the network clock is below a threshold, the trigger address is moved to the index A−1. In other words, once no further adjustments are required and the local timing is adequately aligned to the network timing, the buffer index at which the device switches between the first and second is restored to the normal position, e.g. at the end of the first data buffer. The threshold is preferably equal to or less than the maximum tolerable timing offset, i.e. the greatest timing offset that does not lead to underflow or overflow of data.

When the radio receiver device starts up, i.e. on initialisation, the trigger address could be any index, though the trigger address is, in some embodiments, preferably set to index A−1 on initialisation. In accordance with such embodiments, the default assumption is that there is no timing offset and the receiver should switch buffers at the normal time. Thus if no adjustments are needed because the local and network timings are aligned from the beginning, the trigger address may remain at index A−1.

Once the second data buffer is filled, the radio receiver device may immediately begin filling the first data buffer again. In order for this second switch to be carried out, a second buffer switch pointer may, in some embodiments, have a second trigger address at the index A+B+C−1. In embodiments wherein there is a second buffer switch pointer, the aforementioned 'buffer switch pointer' will be referred to as the 'first buffer switch pointer' and the aforementioned 'trigger address' will be referred to as the 'first trigger address'.

However, in some embodiments, the indexed memory portion has a length of at least A+B+C+D memory units, wherein D is a positive, non-zero integer, said memory portion being further arranged such that:

a second timing adjustment buffer has an initial address at an index A+B+C and a final address at an index A+B+C+D−1; and a second buffer switch pointer having a second trigger address and arranged to trigger a switch from the second data buffer to the first buffer when the current address matches the second trigger address, said second trigger address being an address between the index A+B and the index A+B+C+D−1;

wherein the radio receiver device is arranged such that:

if the current address does not match the first trigger address or the second trigger address, the current address is incremented;

if the current address does match the first trigger address, the current address is set to the index A+B;

if the current address does match the second trigger address, the current address is set to the index 0; and if the radio receiver device determines that there is a timing offset between a local reference clock and a network clock, the first and/or second data trigger address(es) are moved in order to reduce the timing offset.

Those skilled in the art will appreciate that such embodiments provide a symmetrical arrangement where the end of each buffer is appended with a respective timing adjustment buffer. This advantageously allows timing adjustments to be made to the timings at which the device switches from the first data buffer to the second data buffer (as before) as well as from the second data buffer to the first data buffer.

While the nominal lengths of the first and second data buffers could be different (ignoring any extension or reduction in their respective length), in general it is preferred that they are the same. As such, in preferred embodiments, the length A of the first data buffer is equal to the length C of the second data buffer.

Those skilled in the art will appreciate that the principles of the present invention could be readily applied to a wide variety of radio communication technologies and modulation schemes. In some embodiments, the data symbols comprise orthogonal frequency division multiplexing (OFDM) data symbols. The Applicant has appreciated that these principles are particularly advantageous when applied to LTE radio communications. Thus, in preferred embodiments, the radio receiver device is arranged to carry out LTE radio communications. Similarly, where appropriate, the radio transmitter device may be arranged to carry out LTE radio communications. Those skilled in the art will appreciate that the term 'LTE radio communications' as used herein is understood to encompass all variants of LTE communications including but not limited to: classic LTE; NarrowBand IoT (NB-IoT or LTE Cat NB1; enhanced Machine Type Communication (eMTC); and other LTE-based standards.

When used in the context of LTE radio communications, the first and second data buffers may each be one sub-frame wide, such that each buffer stores fourteen data symbols. Thus, in some embodiments, the first and/or second (and preferably both) buffers are a plurality of data symbols long. In some such embodiments, the first and/or second buffers are fourteen data symbols long, such that they can each store one sub-frame. However, in alternative embodiments, the first and/or second buffers may be one slot (i.e. seven data symbols) long or may be one symbol long. The optimal choice of buffer length may depend on a trade-off between the required memory size and the rate at which the processor is interrupted.

In general, the length B of the timing adjustment buffer is less than each of the lengths A and C of the first and second data buffers respectively. As timing errors may typically be less than the duration of a single data symbol, the timing adjustment buffer may have a length equal to or less than the length of a data symbol. For example, in some extreme cases, a single memory index may be sufficient.

As explained previously, the data stored in the buffers is advantageously synchronised properly to the network time (e.g. each buffer contains exactly one sub-frame or any multiple of OFDM symbols, without the sub-frame being split across different buffers due to timing errors) such that a processor can readily access a complete set of related data symbols without having to access multiple buffers. Such a processor could be a separate, down-stream component, however in some embodiments, the radio receiver further comprises a processor arranged such that:

the processor reads the samples from the first data buffer only when the radio receiver device is not writing to the first data buffer; and the processor reads the samples from the second data buffer only when the radio receiver device is not writing to the second data buffer.

In a preferred set of embodiments, the processor comprises a vector processor. Those skilled in the art will appreciate that a vector processor may access the buffers and retrieve the data stored therein simultaneously as a one dimensional array (or "vector") and perform any processing steps that are required of it on all of the data from the buffer in parallel.

In some such embodiments, the indexed memory portion is stored in volatile memory, wherein the volatile memory is within a processor sub-system together with the processor. Having a dedicated memory within the processor sub-system is particularly advantageous as it provides the processor with relatively low latency access to the data stored in the buffers. This volatile memory may, by way of example only, be in a "tightly coupled memory" (TCM) area of random access memory (RAM). Those skilled in the art will appreciate that TCM is a dedicated memory region provided close to the processor in certain processor architectures known in the art per se, which improves the performance of the processor (as there is less latency involved in accessing the data in the buffers within the TCM) and reduced power consumption (as the processor does not need to make as many off-chip memory accesses). Having the memory arranged such that its banks can be accessed in parallel, e.g. by a vector processor as outlined hereinabove, enables relatively high memory access bandwidth which may be key for vector processing. Embodiments of the present invention allow the memory access pattern to remain unaltered regardless of any timing adjustments that are made.

In general, there may be more than two buffers and thus, when viewed from a second aspect, the present invention provides a radio receiver device arranged to receive a plurality of data symbols from an incoming bitstream and store a plurality of samples of each of the plurality of data symbols in an indexed memory portion, said memory portion being logically arranged such that it comprises a plurality of pairs of data buffers and timing adjustment buffers, wherein each pair is of length A+B memory units, where A and B are non-zero, positive integers, each comprising:

a data buffer having an initial address at an index 0 and a final address at an index A−1;
a timing adjustment buffer having an initial address at an index A and a final address at an index A+B−1; and
a buffer switch pointer having a trigger address and arranged to trigger when a current address matches the trigger address, said trigger address being an address between the index 0 and the index A+B−1;
wherein the radio receiver is arranged such that:
on initialisation, the current address is set to the index 0;
each incoming sample is stored at the current address;
if the current address does not match the trigger address, the current address is incremented, but if the current address does match the trigger address, the current address is set to the index 0 of the data buffer within a different pair; and
if the radio receiver device determines that there is a timing offset between a local reference clock and a network clock, the trigger address is moved in order to reduce the timing offset.

This second aspect of the invention extends to a radio communication system comprising a radio transmitter device and a radio receiver device, wherein the radio transmitter device is arranged to transmit a bitstream comprising a plurality of data symbols, and wherein radio receiver device arranged to receive the bitstream from the radio transmitter and store a plurality of samples of the plurality of data symbols in an indexed memory portion, said memory portion being logically arranged such that it comprises a plurality of pairs of data buffers and timing adjustment buffers, wherein each pair is of length A+B memory units, where A and B are non-zero, positive integers, each comprising:

a data buffer having an initial address at an index 0 and a final address at an index A−1;
a timing adjustment buffer having an initial address at an index A and a final address at an index A+B−1; and a buffer switch pointer having a trigger address and arranged to trigger when a current address matches the trigger address, said trigger address being an address between the index 0 and the index A+B−1;

wherein the radio receiver is arranged such that:

on initialisation, the current address is set to the index 0;

each incoming sample is stored at the current address;

if the current address does not match the trigger address, the current address is incremented, but if the current address does match the trigger address, the current address is set to the index 0 of the data buffer within a different pair; and if the radio receiver device determines that there is a timing offset between a local reference clock and a network clock, the trigger address is moved in order to reduce the timing offset.

This second aspect of the invention also extends to a method of operating a radio receiver device arranged to receive a plurality of data symbols from an incoming bitstream and store a plurality of samples of each of the plurality of data symbols in an indexed memory portion, said memory portion being logically arranged such that it comprises a plurality of pairs of data buffers and timing adjustment buffers, wherein each pair is of length A+B memory units, where A and B are non-zero, positive integers, each comprising:

a data buffer having an initial address at an index 0 and a final address at an index A−1;

a timing adjustment buffer having an initial address at an index A and a final address at an index A+B−1; and a buffer switch pointer having a trigger address and arranged to trigger when a current address matches the trigger address, said trigger address being an address between the index 0 and the index A+B−1;

wherein the method comprises:

setting the current address to the index 0 on initialisation;

storing each incoming sample at the current address;

incrementing the current address if the current address does not match the trigger address, but setting the current address to the index 0 of the data buffer within a different pair if the current address does match the trigger address; and determining when there is a timing offset between a local reference clock and a network clock and moving the trigger address in order to reduce the timing offset.

This second aspect of the invention further extends to a non-transitory, computer readable medium comprising instructions that, when executed on a suitable processor, performs a method of operating a radio receiver device arranged to receive a plurality of data symbols from an incoming bitstream and store a plurality of samples of each of the plurality of data symbols in an indexed memory portion, said memory portion being logically arranged such that it comprises a plurality of pairs of data buffers and timing adjustment buffers, wherein each pair is of length A+B memory units, where A and B are non-zero, positive integers, each comprising:

a data buffer having an initial address at an index 0 and a final address at an index A−1;

a timing adjustment buffer having an initial address at an index A and a final address at an index A+B−1; and a buffer switch pointer having a trigger address and arranged to trigger when a current address matches the trigger address, said trigger address being an address between the index 0 and the index A+B−1;

wherein the method comprises:

setting the current address to the index 0 on initialisation;

storing each incoming sample at the current address;

incrementing the current address if the current address does not match the trigger address, but setting the current address to the index 0 of the data buffer within a different pair if the current address does match the trigger address; and determining when there is a timing offset between a local reference clock and a network clock and moving the trigger address in order to reduce the timing offset.

Those skilled in the art will appreciate that the optional features described in relation to embodiments of the first aspect of the invention also apply, where appropriate, to the second aspect of the invention.

BRIEF DESCRIPTION OF DRAWINGS

Certain embodiments of the invention will now be described, by way of example only, with reference to the accompanying drawings in which.

DETAILED DESCRIPTION

Figure 1:
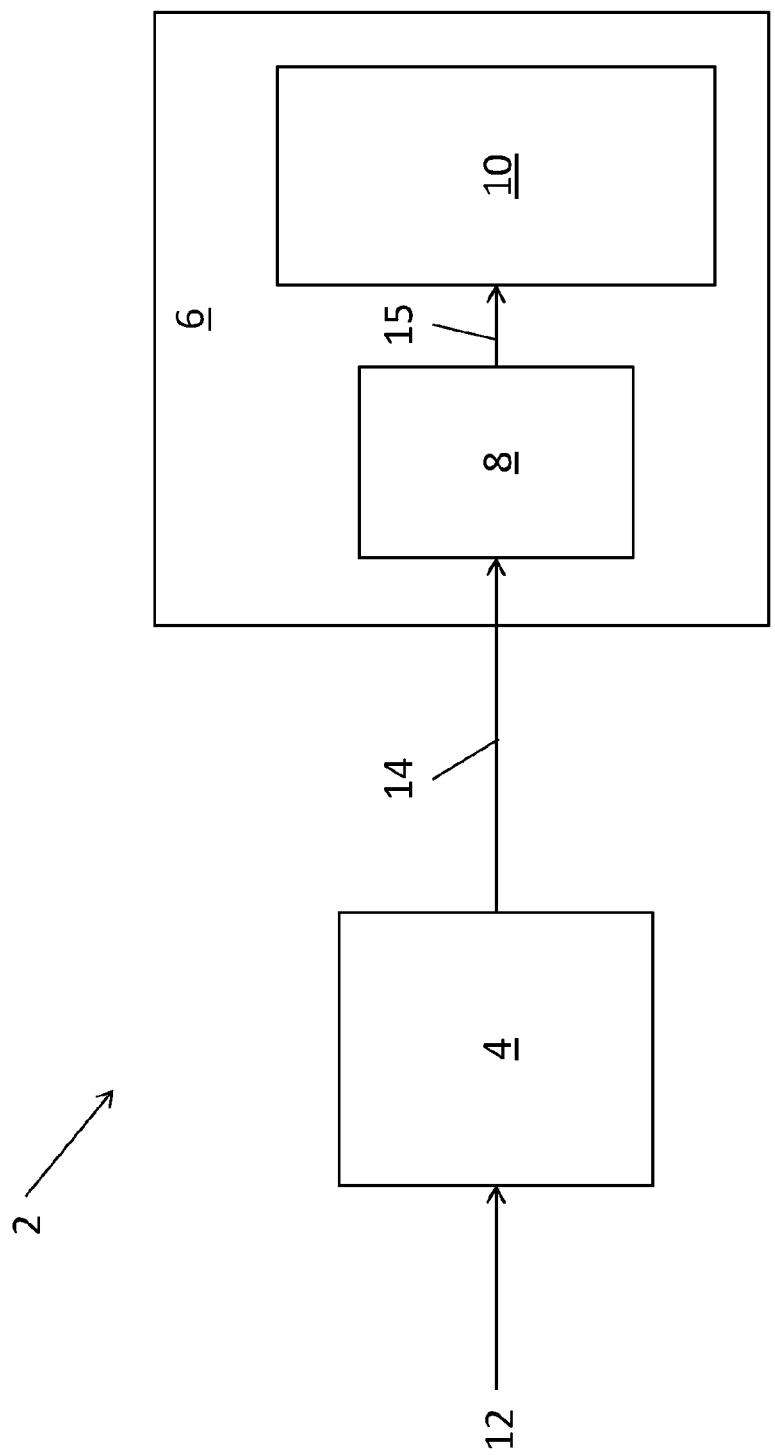
FIG. 1 is a block diagram of a radio receiver device in accordance with an embodiment of the present invention.

FIG. 1 is a block diagram of a radio receiver device 2 in accordance with an embodiment of the present invention. The radio receiver device 2 comprises a hardware unit 4 and a processor subsystem 6. The processor subsystem 6 comprises a "tightly coupled memory" (TCM) 8 and a vector processor 10. Each of these components will be described in turn below.

The hardware unit 4 is arranged to receive incoming data signals 12 which may, for example, be received via an upstream radio front end including an antenna (not shown) that is arranged to receive LTE signals over an LTE network. The hardware unit 4 is arranged to process the signals 12 before storing them in the buffers within the TCM 8.

The hardware unit 4 produces samples 14 that are suitable for storing within two or more buffers within the TCM 8 as will be described in further detail below with reference to FIG. 2. The vector processor 10 can then retrieve the data 15 stored within the TCM 8 as a one dimensional array (i.e. a vector) and perform any processing steps that are required of it at a later time. The samples 14, 15 may be converted to the frequency domain by the processor 10 in a manner known in the art per se, for example using a fast Fourier transform (FFT).

While in this embodiment, the memory in which the signals 14 are stored is within the processor subsystem 6, it will be appreciated that the memory may instead be located externally of the processor subsystem 6 in other embodiments.

Figure 2:
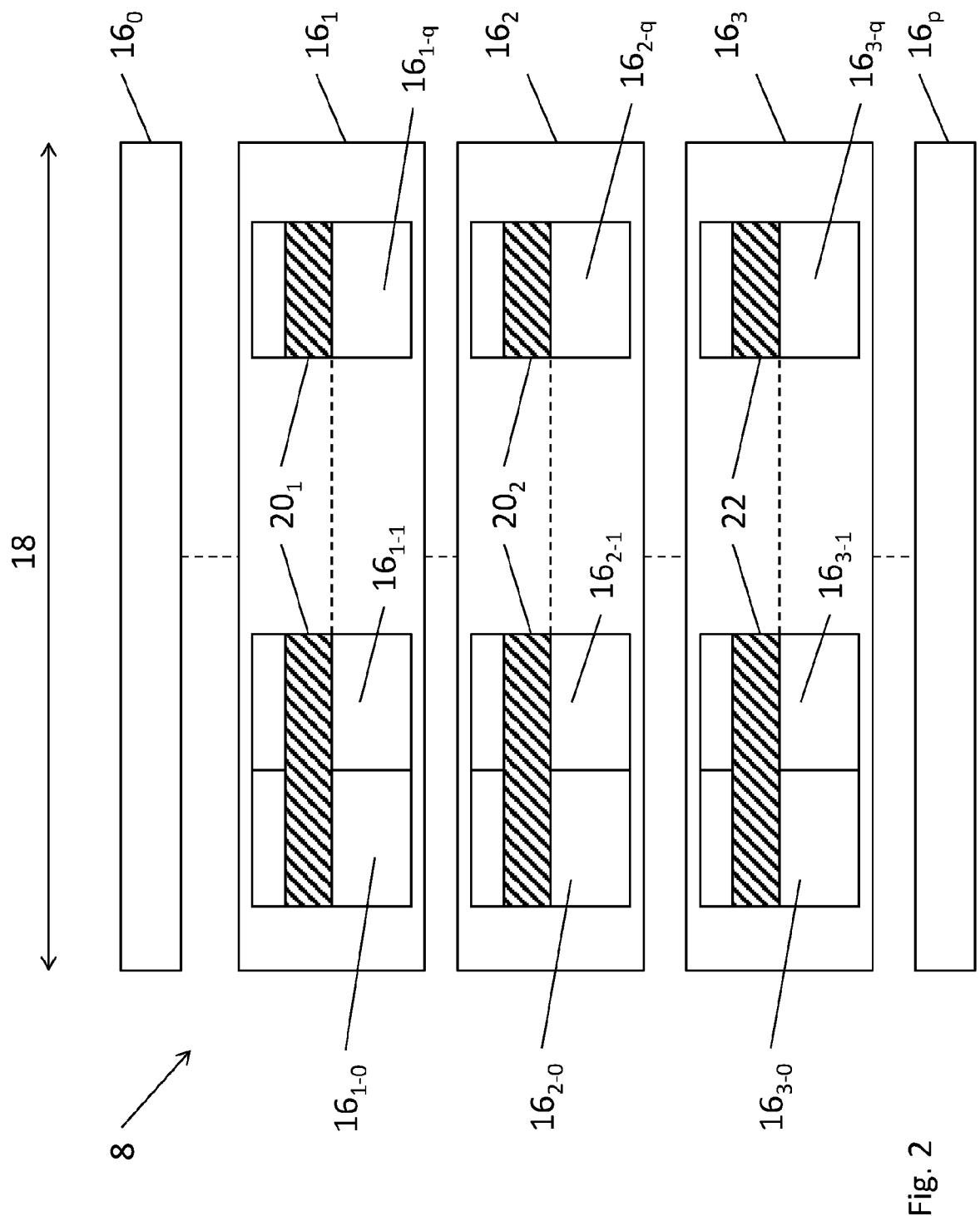
FIG. 2 is a block diagram of a memory arrangement comprising the buffers for use in the radio receiver device of FIG. 1.

FIG. 2 is a block diagram illustrating how the buffers are arranged logically within the TCM 8. The TCM 8 is divided into a number of memory blocks $16_0$ to $16_p$, i.e. there are p+1 memory blocks. Each of these memory blocks $16_0$ to $16_p$ have a width 18 such that all of the memory blocks $16_0$ to $16_p$ are the same size, however it will be appreciated that this is optional and in general the memory blocks $16_0$ to $16_p$ could be of different sizes.

Each of the memory blocks $16_0$ to $16_p$ are divided into a number of memory banks. For example, the memory block $16_1$ is divided into memory banks $16_{1\text{-}0}$ to $16_{1\text{-}q}$ i.e. each memory block $16_0$ to $16_p$ is divided into q+1 memory banks.

In this particular embodiment, the TCM 8 is arranged to provide two buffers. The first data buffer $20_1$ comprises the memory banks $16_{1\text{-}0}$ to $16_{1\text{-}q}$ of a first memory block $16_1$. Similarly, the second data buffer $20_2$ comprises the memory banks $16_{2\text{-}0}$ to $16_{2\text{-}q}$ of a second memory block $16_2$. In order to facilitate LTE communications, each of these buffers $20_1$, $20_2$ are one sub-frame wide, i.e. they are each arranged to store fourteen OFDMA data symbols. The TCM 8 is arranged such that these memory blocks $16_1$, $16_2$ may be accessed simultaneously, in parallel. As will be described below, this allows one buffer to be filled while the other is read by the vector processor 10.

It will of course be appreciate that the buffers $20_1$, $20_2$ may have other widths, for example they may be one slot (i.e. seven OFDMA symbols) wide or they may be a single OFDMA symbol wide. The number of memory indices (i.e. the number of samples) that are needed for each incoming OFDMA symbol depends on the sample rate being used which, in turn, depends on the LTE bandwidth being used. For example the bandwidth may be either 1.4, 3, 5, 10, or 20 MHz, where the corresponding sample rate is 1.92, 3.84, 7.68, 15.36, 23.04, or 30.72 MHz respectively.

The TCM 8 is also arranged to store a timing adjustment buffer 22. The timing adjustment buffer 22 is stored in the memory banks $16_{3\text{-}0}$ to $16_{3\text{-}q}$ of a third memory block 22. The operation of this timing adjustment buffer 22 is described in further detail with reference to FIG. 3 below.

While in the arrangement of FIG. 2 there are two data buffers $20_1$, $20_2$ and one timing adjustment buffer 22, it will be appreciated that, in general, there may be more than two data buffers and more than one timing adjustment buffer, where these additional data and/or timing adjustment buffers may be stored in one or more of the other memory blocks $16_0$ to $16_p$. The timing adjustment buffer 22 could instead be located in the same block as one of the data buffers $20_1$, $20_2$.

Operation of the radio receiver device 2 of FIG. 1 will now be described with reference to FIGS. 3 to 5, which illustrate how the device 2 may adjust the timing at which it swaps between storing the samples 14 in the first data buffer $20_1$ and the second data buffer $20_2$.

Figure 3:
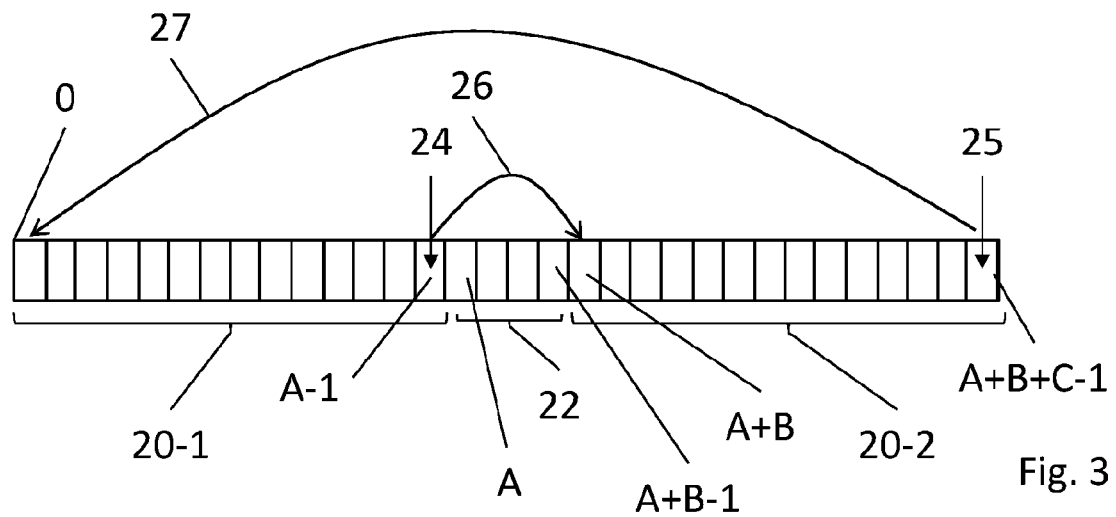
FIG. 3 is a timing diagram illustrating operation of the radio receiver device of FIG. 1 when no timing adjustment is needed.

FIG. 3 is a timing diagram illustrating operation of the radio receiver device 2 of FIG. 2 when no timing adjustment is needed. In general, the hardware unit 4 is arranged initially to store samples 14 of each incoming data symbol in the first data buffer $20_1$ which is indexed from 0 to A–1 (i.e. the first data buffer $20_1$ has a length of A, which, as discussed above, may be 14 data symbols in LTE applications). A timing adjustment buffer 22 is provided from index A to index A+B–1 (i.e. the timing adjustment buffer 22 has a length B). The second data buffer $20_2$ is provided from index A+B to index A+B+C–1.

Initially, the hardware unit 4 directs the samples 14 into the first data buffer $20_1$. It stores each incoming sample 14 in the next subsequent memory address, starting from index 0 and filling up the first data buffer $20_1$ until it reaches the address A–1. A buffer switch pointer 24 has its trigger address (i.e. the 'from' address at which the buffer switch pointer 24 instructs the hardware unit 4 to jump to a different buffer or 'to' address) set to address A–1 which indicates to the hardware unit 4 that it should switch to storing sample data signals 14 in the second data buffer $20_2$. This results in the hardware unit 4 performing a "jump" 26 in the current address from A–1 to A+B, i.e. skipping over the timing adjustment buffer 22 when the current address matches the trigger address.

The hardware unit 4 will then fill the second data buffer $20_2$ starting from the address indexed by A+B until the end of the second data buffer $20_2$ at the address indexed A+B+C–1. The final address of the second data buffer $20_2$ indexed by A+B+C–1 then matches the trigger address of a second data buffer switch pointer 25 which, when that trigger address is reached, indicates to the hardware unit 4 that it should jump back 27 to the first data buffer $20_1$.

Figure 4:
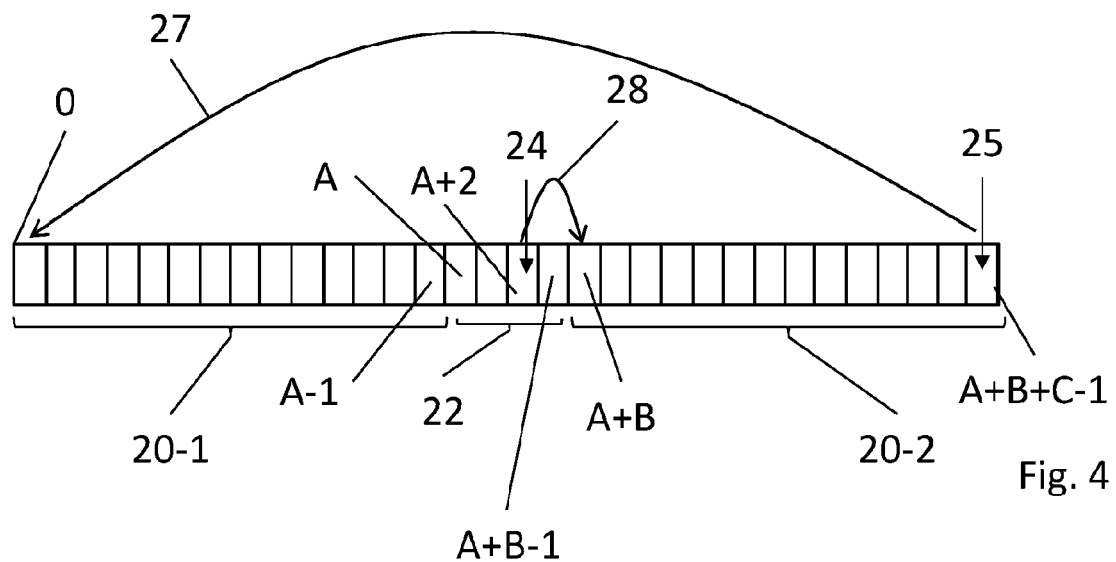
FIG. 4 is a timing diagram illustrating operation of the radio receiver device of FIG. 1 when the buffer switch timing is delayed.

FIG. 4 is a timing diagram illustrating operation of the radio receiver device 2 of FIG. 1 when the buffer switch timing is delayed. As described before with reference to FIG. 3, the hardware unit 4 directs the samples 14 into the first data buffer $20_1$ and stores each incoming sample 14 in the next subsequent memory address, starting from index 0 and filling up the first data buffer $20_1$ until it reaches the address A–1.

However, due to a mismatch between the local timing and the network timing, the radio receiver device 2 has not completely received the incoming data symbol and so switching once address A–1 is reached would cause the samples 14 corresponding to that OFDMA symbol to be stored across both data buffers $20_1$, $20_2$. In this particular example, switching buffers at the normal time as described above with reference to FIG. 3 would result in the switch happening three samples early, leading to the last three samples of the corresponding OFDMA symbol being stored in a different buffer to the other samples of that OFDMA symbol.

In order to address this problem, the hardware unit 4 moves the trigger address of the buffer switch pointer 24 to address A+2, i.e. it delays it by three samples before jumping 28 the current address to A+B to begin filling the second data buffer $20_2$. This effectively extends the length of the first data buffer by making use of some of the extra storage space provided by the timing adjustment buffer 22.

While this may still result in the samples corresponding to this particular OFDMA symbol being divided between different areas in memory, the next incoming OFDMA symbol and all subsequent OFDMA symbols will match the buffer length and normal operation (i.e. as described with reference to FIG. 3) can resume from that point forward, until any future timing issues arise. If the first data buffer, timing adjustment buffer, and second data buffer are arranged logically consecutively in that order, memory management may be made easier, though the timing adjustment benefits are still apparent even if the buffers are located in a different order and/or are not consecutive.

Figure 5:
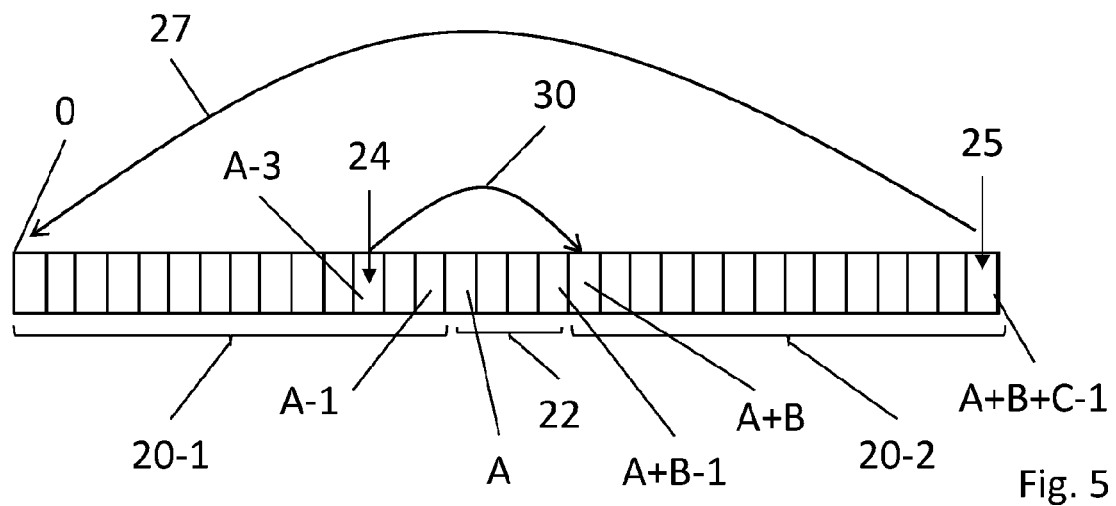
FIG. 5 is a timing diagram illustrating operation of the radio receiver device of FIG. 1 when the buffer switch timing is advanced.

FIG. 5 is a timing diagram illustrating operation of the radio receiver device 2 of FIG. 1 when the buffer switch timing is advanced. As described before with reference to FIG. 3, the hardware unit 4 directs the samples 14 into the first data buffer $20_1$ and stores each incoming sample 14 in the next subsequent memory address, starting from index 0 and filling up the first data buffer $20_1$ sequentially.

However, due to a mismatch between the local timing and the network timing, the radio receiver device 2 has completely received a particular incoming data symbol prior to reaching the end of the first data buffer $20_1$ and so waiting to switch until address A–1 is reached would cause samples of the next OFDMA symbol to be stored across both data buffers $20_1$, $20_2$. In this particular example, switching buffers at the normal time as described above with reference to FIG. 3 would result in the switch happening two samples late, leading to the first two samples of the next incoming OFDMA symbol being stored in a different buffer to the remainder.

In order to address this problem, the hardware unit 4 moves the trigger address of the buffer switch pointer 24 to address A−3, i.e. it advances it by two samples such that it jumps 30 the current address to A+B before even reaching A−1 and begins filling the second data buffer $20_2$. This effectively reduces the length of the first data buffer.

As in the case described with reference to FIG. 4, once this timing adjustment is made, the next incoming OFDMA symbol and all subsequent OFDMA symbols will match the buffer length and normal operation (i.e. as described with reference to FIG. 3) can resume from that point forward, until any future timing issues arise.

Thus it will be appreciated by those skilled in the art that embodiments of the present invention provide an improved radio receiver device that can dynamically adjust its local timing relative to the network timing so as to realign the buffer switching point in order to ensure that the samples of the data symbols are stored correctly (i.e. it can adjust the timing 'on-the-fly', during operation). It will be appreciated by those skilled in the art that the embodiments described above are merely exemplary and are not limiting on the scope of the invention.

The invention claimed is:

1. A radio receiver device comprising:
an indexed memory portion having a length of at least A+B+C memory units, wherein A, B, and C are positive, non-zero integers, and wherein the radio receiver device is arranged to receive a plurality of data symbols from an incoming bitstream and store a plurality of samples of each of the plurality of data symbols in the indexed memory portion, said indexed memory portion being logically arranged such that:
a first data buffer has an initial address at an index 0 and a final address at an index A−1;
a timing adjustment buffer has an initial address at an index A and a final address at an index A+B−1;
a second data buffer has an initial address at an index A+B and a final address at an index A+B+C−1; and
a buffer switch pointer having a trigger address and arranged to trigger a switch from the first data buffer to the second data buffer when a current address matches the trigger address, said trigger address being an address between the index 0 and the index A+B−1;
wherein the radio receiver is arranged such that:
on initialisation, the current address is set to the index 0;
each of the plurality of samples is stored at the current address;
if the current address does not match the trigger address, the current address is incremented, but if the current address does match the trigger address, the current address is set to an index A+B; and
if the radio receiver device determines that there is a timing offset between a local reference clock and a network clock, the trigger address is moved in order to reduce the timing offset.

2. The radio receiver device of claim 1, further arranged such that if the radio receiver device determines that any remaining timing offset between the local reference clock and the network clock is below a threshold, the trigger address is moved to the index A−1.

3. The radio receiver device as claimed of claim 1, wherein the trigger address is set to index A−1 on initialisation.

4. The radio receiver device of claim 1, wherein a second data buffer switch pointer has a second trigger address at an index A+B+C−1.

5. The radio receiver device of claim 1, wherein the indexed memory portion has a length of at least A+B+C+D memory units, wherein D is a positive, non-zero integer, said indexed memory portion being further arranged such that:
a second timing adjustment buffer has an initial address at an index A+B+C and a final address at an index A+B+C+D−1; and
a second buffer switch pointer having a second trigger address and arranged to trigger a switch from the second data buffer to the first data buffer when the current address matches the second trigger address, said second trigger address being an address between the index A+B and the index A+B+C+D−1;
wherein the radio receiver device is arranged such that:
if the current address does not match the trigger address or the second trigger address, the current address is incremented;
if the current address does match the trigger address, the current address is set to the index A+B;
if the current address does match the second trigger address, the current address is set to the index 0; and
if the radio receiver device determines that there is a timing offset between a local reference clock and a network clock, the trigger address and/or the second trigger address(es) are moved in order to reduce the timing offset.

6. The radio receiver device of claim 1, wherein a length A of the first data buffer is equal to a length C of the second data buffer.

7. The radio receiver device of claim 1, wherein the data symbols comprise orthogonal frequency division multiplexing data symbols.

8. The radio receiver device of claim 1, arranged to carry out LTE radio communications.

9. The radio receiver device of claim 1, wherein the first and/or second data buffers are a plurality of data symbols long.

10. The radio receiver device of claim 1, further comprising a processor arranged such that:
the processor reads the samples from the first data buffer only when the radio receiver device is not writing to the first data buffer; and
the processor reads the samples from the second data buffer only when the radio receiver device is not writing to the second data buffer.

11. The radio receiver device of claim 10, wherein the processor comprises a vector processor.

12. A non-transitory, computer readable medium comprising instructions that, when executed on a suitable processor, performs a method of operating a radio receiver device, the radio receiver device comprising:
an indexed memory portion having a length of at least A+B+C memory units, wherein A, B, and C are positive, non-zero integers, and wherein the radio receiver device is arranged to receive a plurality of data symbols from an incoming bitstream and store a plurality of samples of each of the plurality of data symbols in the indexed memory portion, said indexed memory portion being logically arranged such that:
a first data buffer has an initial address at an index 0 and a final address at an index A−1;

a timing adjustment buffer has an initial address at an index A and a final address at an index A+B−1;

a second data buffer has an initial address at index an A+B and a final address at an index A+B+C−1; and a buffer switch pointer having a trigger address and arranged to trigger a switch from the first data buffer to the second data buffer when a current address matches the trigger address, said trigger address being an address between the index 0 and the index A+B−1;

wherein the method comprises:

setting the current address to the index 0 on initialisation;

storing each of the plurality of samples at the current address;

incrementing the current address if the current address does not match the trigger address, but setting the current address to an index A+B if the current address does match the trigger address; and determining when there is a timing offset between a local reference clock and a network clock and moving the trigger address in order to reduce the timing offset.

13. A radio receiver device comprising:

an indexed memory portion, wherein the radio receiver device is arranged to receive a plurality of data symbols from an incoming bitstream and store a plurality of samples of each of the plurality of data symbols in the indexed memory portion, said indexed memory portion being logically arranged such that the indexed memory portion comprises a plurality of pairs of data buffers and timing adjustment buffers, wherein each pair is of length A+B memory units, where A and B are non-zero, positive integers, each comprising:

a data buffer having an initial address at an index 0 and a final address at an index A−1;

a timing adjustment buffer having an initial address at an index A and a final address at an index A+B−1; and a buffer switch pointer having a trigger address and arranged to trigger when a current address matches the trigger address, said trigger address being an address between the index 0 and the index A+B−1;

wherein the radio receiver device is arranged such that:

on initialisation, the current address is set to the index 0;

each of the plurality of samples is stored at the current address;

if the current address does not match the trigger address, the current address is incremented, but if the current address does match the trigger address, the current address is set to the index 0 of a data buffer within a different pair; and if the radio receiver device determines that there is a timing offset between a local reference clock and a network clock, the trigger address is moved in order to reduce the timing offset.

* * * * *